April 9, 1935.　　　　B. M. YOUNG　　　　1,997,505
TOASTER
Filed July 3, 1934
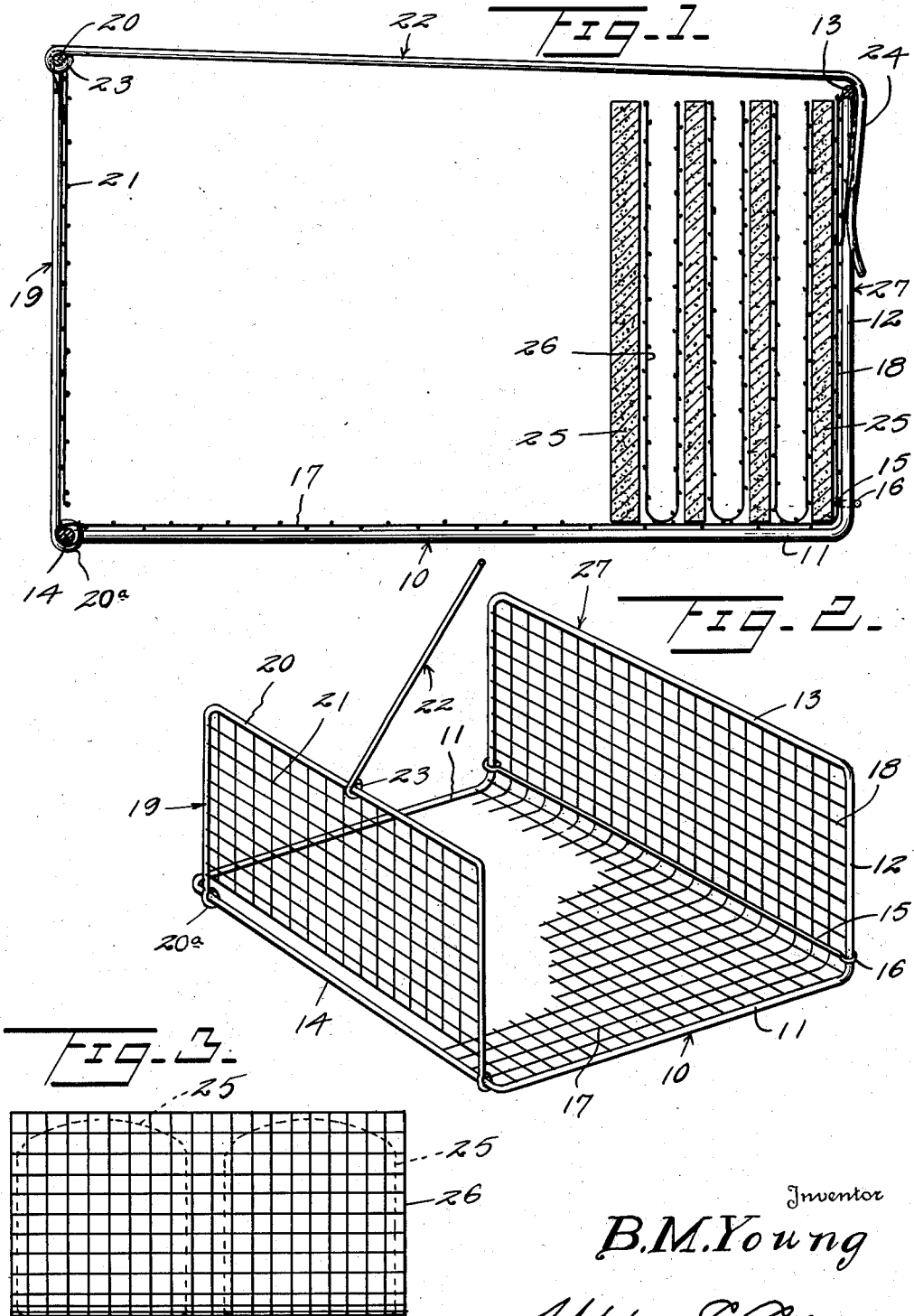
Inventor
B. M. Young
By Watson E. Coleman
Attorney

Patented Apr. 9, 1935

1,997,505

UNITED STATES PATENT OFFICE

1,997,505

TOASTER

Byrnes M. Young, Morgan City, La.

Application July 3, 1934, Serial No. 733,635

7 Claims. (Cl. 53—5)

This invention relates to bread toasting devices and has for an important object thereof the provision of a toaster so constructed as to permit of the toasting on both sides of a plurality of slices of bread.

Another object of this invention is to provide a bread supporting rack which is adapted to be inserted in an oven or other heating means and which is constructed to permit of the toasting of substantially an entire loaf of bread at one time, the slices of the bread being toasted on both sides after the manner of what is commonly known as melba toast, and also soft toast.

A further object of this invention is to provide a toaster of this kind which is so constructed that a plurality of slices of bread may be supported for toasting, the inner slices being spaced one from another and from the outer slices so that the heat in the heating means will be evenly distributed throughout the slices supported in the toasting rack.

The above and various other objects and advantages of this invention will in part be described and in part be understood from the following detailed description, the same being illustrated in the accompanying drawing, wherein:—

Figure 1 is a longitudinal section taken substantially through the center of a device constructed according to the embodiment of this invention, the device having a number of slices of bread mounted therein, which are spaced apart.

Figure 2 is a perspective view of the toasting rack.

Figure 3 is a front elevation of one of the bread spacing members showing several slices of bread in dotted lines.

Referring to the drawing wherein like numerals of reference designate corresponding parts throughout the several views, the numeral 10 designates generally a frame structure comprising side bars 11 and end bars 12 disposed at a right angle to the bottom or side bars 11. The end bars 12 are connected together at their upper ends by a connecting bar 13 and the side or bottom bars 11 are connected together as by a bar 14. In the present instance, the bars 11, 12, 13 and 14 are constructed from a single piece of wire suitably bent with the free ends thereof welded or otherwise secured together so as to provide a closed looped frame structure. A connecting link or bar 15 in the present instance having eyes 16, one at each end, is disposed adjacent the lower ends of the side bars 12 and holds the side bars 12 and the bottom bars 11 against spreading.

A screen 17 is disposed between the bottom bars 11 and one edge of the screen 17 is continued so as to form a perforate side wall 18. The bottom 17 also permits the free passage of heat upwardly through the frame when the device is placed in an oven or other heating means. A second side wall structure, generally designated as 19 is carried by the frame 10 opposite from the fixed side wall 18. This wall 19 comprises a substantially U-shaped frame 20 constructed of a single piece of wire and having eyes 20ª on the ends of each parallel leg thereof, which eyes engage about the bar 14. A perforate, mesh structure 21 is carried by the frame 20. In the present instance an elongated hook 22 having an eye 23 is carried by the hinged wall 19 and the downturned end portion 24 of this hook is adapted to engage over the fixed side wall and acts to hold the hinged side wall 19 substantially parallel with the opposite or fixed wall. The side walls of this structure have a length substantially greater than the width of at least two slices of bread so that at least two slices of bread may be placed end for end within the frame with the abutting edges of the bread spaced apart a slight distance. The frame herein disclosed is adapted to hold substantially an entire loaf of sliced bread with the slices spaced apart laterally and longitudinally of the frame 10.

In order to hold the abutting faces of the slices of bread 25 apart, said slices being of equal or varying thickness, I have provided a plurality of spacing members, generally designated as 26. These spacing members 26 are mesh or perforate and the bottom of the spacing members 26 is adapted to rest on the bottom of the frame 10. By the use of these mesh or perforate spacing members 26, the slices of bread 25 are held apart so that heat may freely pass therebetween and in this manner, a considerable quantity of slices of bread may be placed in the frame 10 and the entire frame then placed in an oven or other heating means until the bread has been thoroughly toasted.

In the use of this device, when it is desired to fill the frame 10 with bread, preferably the frame is set on its side with the fixed side 27 lowermost. Initially two or more slices of bread may be placed on top of the lowered side wall 27, then a spacing member 26 may be placed on top of the lowermost slices of bread whereupon additional slices may be placed on the spacing members and the process continued until the entire frame 10 is filled with bread. Where it is desired to toast only a few slices of bread, these slices may be placed in the frame 10 adjacent one side and the remaining space of the frame 10 filled with the spacing members 26 so that when the hook or securing member 22 is in locked position, the slices of bread in the device will be securely held therein while at the same time hot air may freely circulate about the slices of bread so as to thoroughly toast the bread.

It will be apparent from the foregoing that the device herein disclosed is exceedingly simple in construction and is adapted for use particularly in establishments requiring the toasting of a number of slices of bread at one time with the slices toasted relatively hard, and through the use of this device, the bread is held against curling, being held flat within the frame by means of the side walls and the spacing members so that the relatively hard toast will present a pleasing appearance when served.

What is claimed is:—

1. A toasting means as set forth, comprising an open frame structure adapted to receive therein slices of bread for toasting, and perforate spacing members adapted to be disposed within the frame and between rows of slices for holding the rows of slices in spaced relation to each other to permit the even distribution of heat about the innermost slices within the frame.

2. A toasting means as set forth, comprising a substantially U-shaped frame structure adapted to receive therein slices of bread, and a plurality of perforate spacing members insertible between rows of bread slices for holding the rows in spaced apart relation to permit the even distribution of heat about the innermost slices of bread.

3. A toasting means as set forth, comprising a substantially U-shaped perforate frame, means for mounting one side of said frame for movement relative to the other, a securing means for holding said movable side against movement, and a spacing means insertible between rows of bread slices to hold the rows in spaced apart relation, said spacing means comprising a perforate member.

4. A toasting means as set forth, comprising a substantially U-shaped perforate frame structure having one side thereof movable, means for holding said movable side in substantially parallel relation to the other side, and a mesh spacing member insertible between the confronting faces of bread slices to hold the bread slices in spaced apart relation and permit the even distribution of heat about the bread slices while holding the slices of bread against curling under the action of heat.

5. A toasting means as set forth, comprising a perforate bottom member, a perforate side member fixed to one edge of said bottom member and disposed at a right angle to the bottom, a second side member, means for movably mounting said second side member on the opposite edge of the bottom in this instance, a hook carried by the movable side member engageable with the fixed side member to hold the movable side member in substantially parallel relation to the fixed side member, and perforate spacing means insertible between the two side members and between slices of bread to hold the bread in spaced apart relation for permitting the even distribution of heat about the surface of the innermost slices of bread.

6. A toasting means as set forth, comprising a relatively flat bottom perforate metal structure, a fixed perforate side wall secured to one edge of the bottom, said bottom and said side wall comprising a single piece of perforate metal mesh bent in substantially rectangular form, a second side wall that is movable, means for securing said movable second side wall to the opposite end of the bottom so that it will be held at right angles to the bottom and parallel to the fixed side wall, and a plurality of spacing members insertible in the frame between slices of bread for holding the slices in spaced apart relation to permit the even distribution of heat thereabout.

7. A toasting means as set forth, comprising a substantially U-shaped perforate metal frame structure having one side thereof movable, means for holding said movable side in substantially parallel relation to the other side to permit the toasting on both sides of a plurality of slices of bread of equal or varying thickness, perforate spacing members insertible between the confronting faces of bread slices to hold the bread slices in spaced apart relation and permit the even distribution of heat about the bread slices while holding the slices of bread of all thicknesses against curling under the action of heat.

BYRNES M. YOUNG.